(12) United States Patent
Best et al.

(10) Patent No.: US 9,253,167 B2
(45) Date of Patent: Feb. 2, 2016

(54) DEVICE AND SYSTEM FOR FACILITATING COMMUNICATION AND NETWORKING WITHIN A SECURE MOBILE ENVIRONMENT

(75) Inventors: Randolph Best, Phoenix, AZ (US); Rinaldo Spinella, Medford, MA (US); James Morris, Phoenix, AZ (US)

(73) Assignee: Apriva, LLC, Scottsdale, AZ (US)

( * ) Notice: Subject to any disclaimer, the term of this patent is extended or adjusted under 35 U.S.C. 154(b) by 0 days.

(21) Appl. No.: 13/090,086

(22) Filed: Apr. 19, 2011

(65) Prior Publication Data

US 2012/0269346 A1   Oct. 25, 2012

(51) Int. Cl.
*G06F 21/00* (2013.01)
*H04L 29/06* (2006.01)
*H04W 12/02* (2009.01)

(52) U.S. Cl.
CPC .......... *H04L 63/0457* (2013.01); *H04W 12/02* (2013.01)

(58) Field of Classification Search
CPC .................................................. H04W 12/02
USPC .......................................................... 726/6, 9
See application file for complete search history.

(56) References Cited

U.S. PATENT DOCUMENTS

| | | | |
|---|---|---|---|
| 7,644,171 B2* | 1/2010 | Sturniolo et al. | 709/230 |
| 8,195,153 B1* | 6/2012 | Frencel et al. | 455/433 |
| 2004/0003247 A1 | 1/2004 | Fraser et al. | |
| 2004/0267618 A1* | 12/2004 | Judicibus et al. | 705/16 |
| 2004/0268148 A1* | 12/2004 | Karjala et al. | 713/201 |
| 2008/0034440 A1* | 2/2008 | Holtzman et al. | 726/27 |
| 2009/0030842 A1* | 1/2009 | Hoffman et al. | 705/66 |
| 2009/0044260 A1* | 2/2009 | Niglio et al. | 726/9 |
| 2009/0061838 A1* | 3/2009 | Lin | 455/418 |
| 2009/0094681 A1* | 4/2009 | Sadler et al. | 726/4 |
| 2009/0138697 A1 | 5/2009 | Kim et al. | |
| 2010/0064341 A1* | 3/2010 | Aldera | 726/1 |

(Continued)

FOREIGN PATENT DOCUMENTS

| | | |
|---|---|---|
| WO | 2009154580 | 12/2009 |
| WO | 2010151873 | 12/2010 |

OTHER PUBLICATIONS

International Preliminary Report on Patentability dated Oct. 31, 2013 in Application No. PCT/US2012/034042.

(Continued)

*Primary Examiner* — Morshed Mehedi
(74) *Attorney, Agent, or Firm* — Law Office of David O. Caplan, PLLC (57) ABSTRACT

The present invention relates generally to facilitating secure voice and data communication by way of a commercially available communication device (i.e., smartphone/smartdevice). Specifically, the device and system for pairing a specialized cryptographic device with a non-specialized communication device, wherein the two devices engage in bidirectional communication to facilitate encryption of voice and data for secure transmission over a network. While providing the sensitive cryptographic features for secure communications, the cryptographic device further implements and enforces security policies for the communication device by way if an intermediary native application executed at the communication device. The encryption device is suitably designed to be carried discreetly and may be used in conjunction with a commercially available communication device.

19 Claims, 3 Drawing Sheets

(56) References Cited

U.S. PATENT DOCUMENTS

| | | | |
|---|---|---|---|
| 2010/0107222 A1* | 4/2010 | Glasser | 726/3 |
| 2010/0306837 A1* | 12/2010 | Ueno et al. | 726/7 |
| 2010/0317324 A1* | 12/2010 | Brown et al. | 455/411 |
| 2011/0053560 A1* | 3/2011 | Jain et al. | 455/411 |
| 2011/0238580 A1* | 9/2011 | Coppinger | 705/67 |
| 2012/0034933 A1* | 2/2012 | Bradley | 455/456.3 |
| 2012/0092441 A1* | 4/2012 | Kong et al. | 348/14.08 |
| 2012/0131653 A1* | 5/2012 | Pasquero et al. | 726/6 |

OTHER PUBLICATIONS

International Search Report and Written Opinion dated Oct. 23, 2012 in Application No. PCT/US2012/034042.

* cited by examiner

DEVICE AND SYSTEM FOR FACILITATING COMMUNICATION AND NETWORKING WITHIN A SECURE MOBILE ENVIRONMENT

FIELD OF THE INVENTION

The disclosed device and system provides a unique ability to secure Commercial off the Shelf (COTS) and disparately located communication devices in order to provide levels of security not previously possible with a hidden, near field connected, wireless, or wired COTS devices. Specifically, the device and system includes a mobile cryptographic device comprising hardware and software for implementing both Type 1 and Non-Type 1 encryption. The mobile cryptographic device connects by way of a wireline or wireless network to a COTS device to allow the smartphone/smartdevice to securely exchange voice and data over a communications network.

BACKGROUND

Prior to the modern age, cryptology was almost synonymous with encryption In general; encryption is the conversion of information from a readable state (plaintext) to apparent nonsense (ciphertext). The information sender retains the ability to decrypt the information and therefore avoid unwanted persons being able to read it. Prior to the advent of modern computing systems, methods of encryption included the use of pen and paper and simple mechanical devices. These simple methods evolved to complex mechanical and electromechanical machines. Finally, the introduction of electronics and computing allowed elaborate schemes of still greater complexity.

As computing and communications systems have grown in sophistication, so too has the need for increasingly sophisticated methods for maintaining data and communication security. This has created entire industries where public and private organizations continually seek to construct systems, which are impenetrable by eavesdroppers. As an example, governments have relied on cryptography to maintain national secrets. Perhaps the most critical use of cryptographic methods has been by the military sectors, where secrecy is critical to maintaining national security. Like many other governmental entities worldwide, the United States Government has implemented standards, which govern the adoption and implementation of specific cryptography techniques. Corporations have developed various computing and communication devices, which comply with these standards for use by government employees engaging in activities, which require confidentiality.

Computing and communication devices have evolved into more portable and personal devices, which enable users to communicate and exchange information in real-time. As such, the field of opportunity has only increased for eavesdroppers, albeit requiring added sophistication in order to intercept voice and data communications.

The National Security Agency (NSA) has developed a hand-held communication device to provide its personnel with the efficiency and convenience with portable communication devices while maintaining secrecy. The Secure Mobile Environment Portable Electronic Device (SME-PED) enables its users 110 to send and receive both classified and unclassified telephone calls and to exchange classified and unclassified data. In addition, the SME-PED allows the user 110 to web browse on secure networks, which are classified "Secret."

The SME-PED resembles a commercially available cellular telephone with the exception of its increased physical dimensions, which are required to accommodate encryption hardware. While providing the level of security required by such organizations as the NSA, the SME-PED is somewhat limited in its utility. For example, commercially available phones and smartphones/smartdevices are rapidly evolving technologically to provide additional features to their users. As such, the market tends to price such devices such that consumers can replace their device every couple of years or sooner to take advantage of the latest features. Due to the complexity of the SME-PED, pricing flexibility is not an inherent feature and certification takes a long time. Therefore, "upgrading" the device can be cost prohibitive, leaving the user with fewer available features than consumers with commercial devices.

Due to the issues noted above, a user of the SME-PED may often carry multiple devices. As such, the SME-PED device is used for official business only, while a commercial device is used for personal use or whenever conventional communication is adequate. Moreover, most commercial device manufacturers make available a Software Development Kits (SDK) to enable third-party developers to create applications, which will function on the manufacturers' device. This has led to more advanced features for the developer and increased revenues for the device manufacturer, which benefits from the increased options.

Other devices provide data-at-rest encryption and other security features to a device using a hardware encryption key, which may be attached to an electronic device by way of a USB, for example. One recently developed encryption device is configured to be placed between the battery and cellular phone handset. This device is functionally similar to other known hardware encryption keys although it has the added benefit of being secured to the communication device such that it will not be as easily misplaced or mishandled. Nevertheless, integration between the encryption and the communication device is limited. Moreover, this concept requires the encryption device to be geometrically compatible with commercially available handsets.

As noted above, various solutions have been developed in an attempt to provide the same fast, reliable, and convenient mobile communications capabilities, which are presently available through commercially available hardware, software, and networks, to those requiring high levels of data and voice security. However, the integration of highly secure communication features with the productivity features of commercially available devices has been difficult to achieve in a cost effective and practical manner. As such, there is a need for a mobile device, which is capable of providing the levels of encryption and hardware/software control to a commercially available communication device. More specifically, a need exists for a device and system for providing these noted features to a commercial off the shelf cellular telephone or smartphone/smartdevice by way of a disparately located mobile cryptographic device.

SUMMARY OF THE INVENTION

In general, the present invention overcomes the limitations and problems of the prior art by providing a device and system for facilitating secure communication and networking. Specifically, a compact and lightweight mobile cryptographic device is disclosed, which can be paired with a commercially available, non-specialized communication device (e.g., a smartphone/smartdevice) to provide interoperable secure communications across various domains. Operating on a highly secure communications channel linking the mobile cryptographic device to a communication device, the mobile cryptographic device implements various encryption standards in accordance with the High Assurance Internet Protocol Interoperability Specification (HAIPE IS) to provide secure voice and data communications over existing GSM, CDMA, VoIP, PSTN, ISDN, and satellite networks.

The disclosed mobile cryptographic device includes a processor element for receiving a connection request from a disparately located communication device by way of a wired or wireless communications network. A validation element, in communication with the processing element, performs an analysis of the connection request. The analysis includes a validation of the data security system, an identity of the communication device, or a user identity. Upon validation, the processing element receives a communication signal from the disparately located communication device based and an encryption element executes a cryptographic function for manipulating the communication signal to form an encrypted communication signal.

A rules element compiles a communication device command based on a predefined rule and/or a type associated with the communication signal. The communication device command invokes a security function at the disparately located communication device. A sending element sends the security function and/or the encrypted communication signal to the disparately located communication device. The disparately located communication device executes the device command and/or transmits the encrypted communication signal to a destination device.

BRIEF DESCRIPTION OF EXEMPLARY DRAWINGS

A more complete understanding of the present invention may be derived by referring to the detailed description and claims when considered in connection with the Figures, wherein like reference numbers refer to similar elements throughout the Figures, and:

DETAILED DESCRIPTION OF EXEMPLARY EMBODIMENTS

In general, the present invention uniquely enables a non-specialized communication device to facilitate highly secure voice and data communications over a network. The disclosed mobile cryptographic device is separable from the communication device, which allows for it to be discreetly located (e.g., a shirt pocket, purse, handbag, computer bag, briefcase, luggage, etc.). Among others, the mobile cryptographic device includes various hardware components including a processor, memory, transmitter, and receiver. In one embodiment, the mobile cryptographic device is configured to receive and interface with a smartcard—or similar device—to provide additional identity verification and security features.

Figure 1:
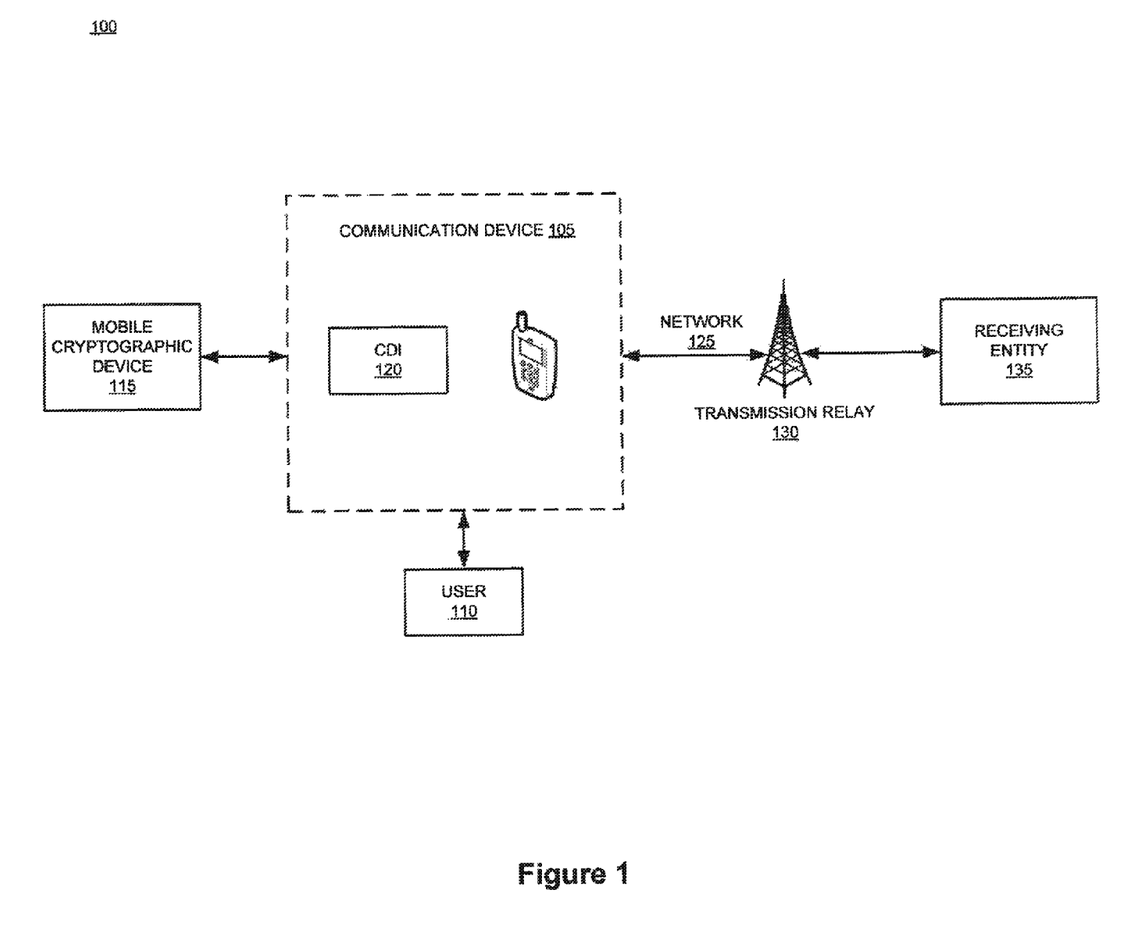
FIG. 1 is a system diagram illustrating system components for managing encryption and communication device policing features in accordance with an exemplary embodiment of the present invention.

With reference to FIG. 1, as used herein, a "communication device" 105 may comprise any hardware, software, or combination thereof configured to send, receive, process and store information in digital form for the purpose of invoking and managing the disclosed payment and loyalty transactions. More specifically, the communication device 105 may be embodied as any combination of hardware and/or software components configured to interact with the disclosed mobile cryptographic device 105 to facilitate secure voice and/or data communication. The communication device 105 may include, for example, a smartphone/smartdevice, cellular telephone, personal digital assistant (PDA), personal computer, tablet computer, electronic fob, computer server, entertainment device, appliance, and the like.

As used herein, the terms "user", "owner", "end user", or "participant" may be used interchangeably with each other, and each shall mean any person, entity, machine, hardware, software, and/or business, which interacts with the communication device to facilitate secure voice and/or data communication by way of the mobile cryptographic device 105. The user 110 may be the owner of the communication device 105, the mobile cryptographic device 105, or both, however; this is not required.

Communication between various entities of the invention is facilitated through or by any suitable communication means, such as, for example, a telephone network, intranet, Internet, Personal Digital Assistant (PDA), cellular phone, smartphone, smartdevice, appliance, kiosk, and etc. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, decryption, compression, decompression, and/or the like.

In addition to a smartphone/smartdevice, the communication device 105 may comprise a typical Radio Frequency (RF) device, which may be implemented in a similar manner as is disclosed in U.S. application Ser. No. 12/553,901, entitled "System and Method for Facilitating Secure Voice Communication Over a Network", which is commonly assigned, and, which is incorporated herein by reference.

One skilled in the art will appreciate that a network may include any system for exchanging data or transacting business, such as the Internet, an intranet, an extranet, WAN, LAN, satellite communications, cellular network, and/or the like. It is noted that the network may be implemented as other types of networks such as, for example, an interactive television (ITV) network. The user 110 may interact with the system via any input device such as a keyboard, mouse, kiosk, personal digital assistant, handheld computer, cellular phone, smartphone, smartdevice, and/or the like. Similarly, the features of the invention may be used in conjunction with any type of personal computer, network computer, workstation, minicomputer, mainframe, or the like running any operating system such as any version of Windows, Windows XP, Windows Vista, Windows NT, Windows 2000, Windows 98, Windows 95, MacOS, OS/2, BeOS, Linux, UNIX, Solaris, or the like. Moreover, although the invention is frequently described herein as being implemented with specific communications protocols, it may be readily understood that the invention could also be implemented using IPX, AppleTalk, IP-6, NetBIOS, OSI or any number of existing or future protocols. Moreover, the system may contemplate the use, sale or distribution of any goods, services or information over any network having similar functionality described herein.

Native Application

The communication device 105 is equipped with an installed native application, which is configured to establish communication with the mobile cryptographic device 105 in order to exchange credentials, encrypted data, and commands. As used herein, the "Cryptographic Device Interface" (CDI) 120 is a native application, which is operative at the communication device 105. The CDI 120 facilitates interaction between applications running at the communication device 105 and the variously disclosed features provided by the mobile cryptographic device 115. Practitioners will appreciate that the communication device 105 may be configured with any number of applications and/or code elements, which function individually with or in relation to other applications and/or code elements to facilitate the disclosed features.

In one embodiment, the CDI 120 includes a user interface element. The user interface element provides a means whereby the user 110 of the communication device 105 can interact with the CDI 120 to perform various features. For example, the user interface element may provide a screen, which allows the user 110 to toggle communication mode between "normal" and "secure", wherein the various features of the mobile cryptographic device 105 are invoked when the user 110 selects the "secure" communication mode.

The interface element also provides the various prompts and messaging, which are useful for instructing the user 110 when an action is required or requested. For example, in order to establish a connection with the mobile cryptographic device 105, the user 110 may be required to interact with the communication device 105 to provide a user credential such as a password, pass code, biometric sample, or the like. Practitioners will appreciate that the communication device 105 may be configured to interact with any number of third-party hardware and/or software components, which facilitate the collection of a biometric (e.g., voiceprint, fingerprint, iris scan) and/or information from another media device (e.g., smartcard, magnetic strip, barcode). In either case, a user 110 credential is transmitted to the mobile cryptographic device 105 and processed as described herein.

While the user credential described above is useful for verifying the user 110 of the communication device 105, other credentials may be obtained and processed by the mobile cryptographic device 105 in order to verify the communication device 105 itself. As such, the CDI 120 may also obtain credentials from the communication device 105 such as, for example, a code from a Subscriber Identification Module (SIM), secure USB device, hardware key, and the like. Practitioners will appreciate that other types of information may be obtained from the communication device 105 in order to perform a verification of the communication device 105.

A security layer of the communication device 105 and/or CDI 120 includes a security interface for collecting user credentials. As used herein, the "security interface" comprises any hardware, software, or combination thereof, which is configured to accept an input by any of the parties described herein. An "input" may be defined as, for example, key presses on a physical keyboard, button selection on a touch screen, a verbal command, a biometric sample read, and the like. Inputs may include, for example, a fingerprint, voiceprint, iris scan, facial feature recognition, and the like. However, practitioners will appreciate that entry of a PIN, or any other indicia described herein, may be performed by any means known in the art.

In one embodiment, the identifying information (i.e., credential), which is required from both the user 110 and the communication device is configurable. This is useful to allow the information owner (e.g., a governmental entity) to determine what level of verification is suitable in relation to the level of security required. For example, a local law enforcement agency may require verification of the user 110 based on the entry of a PIN, while the Federal Secret Service may require an Iris scan from the user 110.

In another embodiment, the required identifying information is variable based on any number of factors including, for example, the geographic location of the communication device; date and time; the identity of the person and or device with whom communication is desired; and the like. For example, the mobile cryptographic device 105 may transmit a request to the communication device to obtain device location. The CDI 120 receives the request and uses the communication device's built-in GPS features to obtain the geographic location of the device. The location information is transmitted from the communication device to the mobile cryptographic device 105, which invokes a rules element to determine the level of verification required based on the physical location of the communication device (e.g., North America, South America, Europe, Middle East, etc.). The verification requirements are transmitted back to the communication device, which invokes the appropriate prompt and/or application needed to obtain required credentials.

In addition to receiving verification related commands, the CDI 120 is configured to receive and process periodic commands from the mobile cryptographic device 105 to perform other functions. Such functions, for example, may include "policing" functions, which perform security checks on the communication device and to regularly locate ant permanently eliminate (i.e., "wipe") information, which may be classified as SECRET.

Mobile Cryptographic Device

Figure 2:
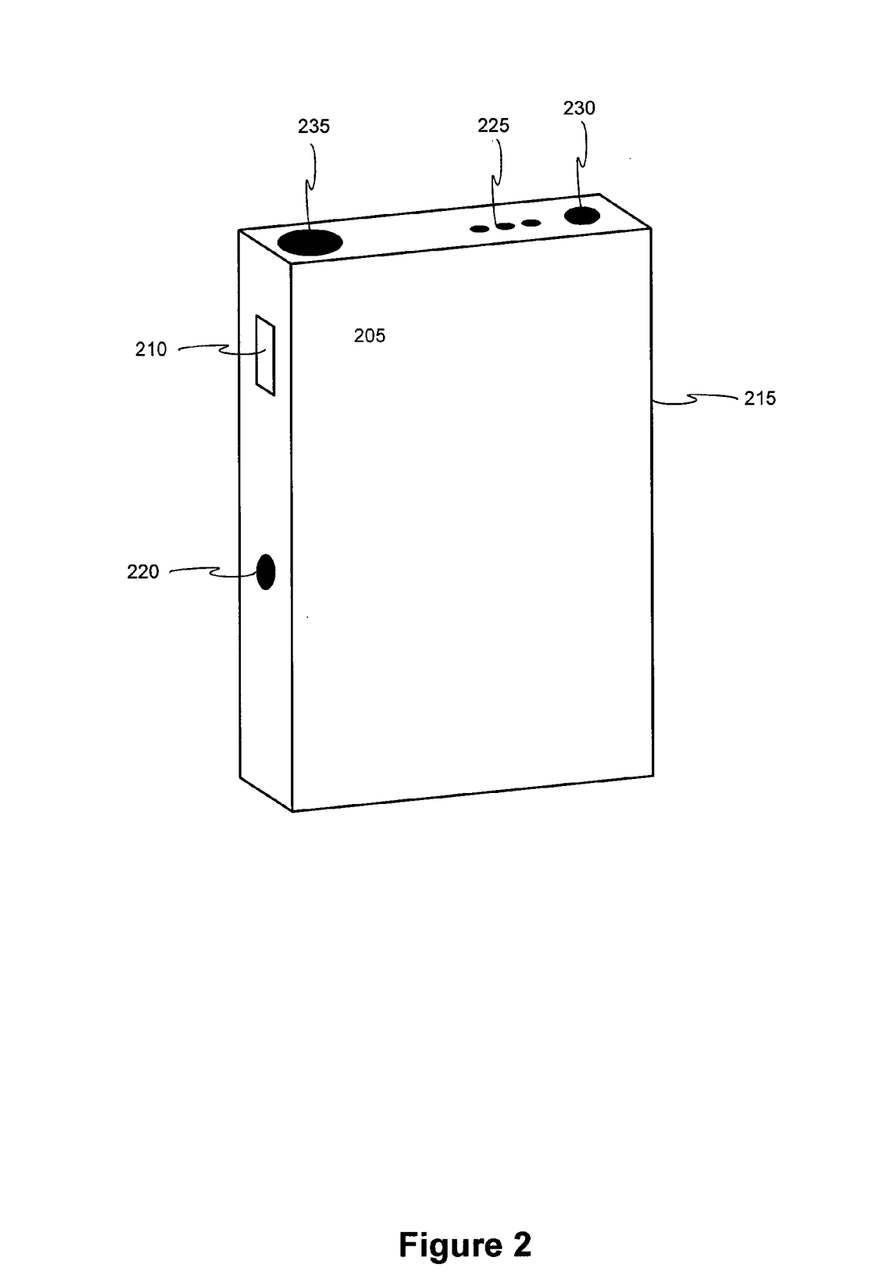
FIG. 2 is a diagram illustrating a mobile cryptographic device in accordance with an exemplary embodiment of the present invention.

With reference to FIG. 2, the mobile cryptographic device 205 is operable independent of the communication device or any other device. The various hardware components described herein are encapsulated within a durable and protected case. Practitioners will appreciate that the case 210 may be constructed of any material and in any configuration, however; it is anticipated that the case 210 is compact in size and is suitably configured to protect the internal components from moisture and contaminates.

More specifically, the mobile cryptographic device case 210 may be ruggedized, such that the device is specifically designed to reliably operate in harsh usage environments and conditions, such as strong vibrations, extreme temperatures and wet or dusty conditions. The design and materials for the case as well as the components therein may be constructed to meet various standards as set forth by private organizations, and governmental entities. One such standard is MIL-STD-810 (also known as Mil-Spec), which is a military standard, issued in 1962, which establishes a set of tests for determining equipment suitability to military operations. Another standard is the MIL-S-901 is a military standard for shock, which applies to equipment mounted on ships. Other organizations such as, for example, IEEE have developed standards for ensuring that computing components are capable of withstanding environmental variances.

With reference to FIG. 2, the mobile cryptographic device 205 may include one or more USB ports (or similar) 210 to enable attachment to an external power source for charging of an internal battery or for attaching peripherals, for example. In one embodiment a USB port 210 allows the mobile cryptographic device to be physically connected to a computing device for configuration, diagnostic, maintenance, and the like. Moreover, the case 215 may include a power button 220, indicator lights 225, mode selectors 230, sender/receiver 235, etc. As used herein, reference to the "mobile cryptographic device" may relate to all or a subset of the various elements included within the device, including the device casing.

In one embodiment, the mobile cryptographic device 205 is tamper resistant in order to further secure the device from unauthorized access to the components and information residing therein. Practitioners will appreciate that a number of known methods exist for rendering devices tamper resistant. Such devices include, for example, complex devices, which render themselves inoperable or encryption of all data transmissions between individual chips within the device.

The mobile cryptographic device 205 may include tamper-resistant components to store and process private or sensitive information such as, for example, private keys. To prevent an attacker from retrieving or modifying the information, the tamper-resistant component may be designed such that the information is not accessible through external means and can be accessed only by the embedded software, which itself includes appropriate security measures.

The tamper-resistant components may be designed to zeroise sensitive data (i.e., cryptographic keys) if penetration of their security encapsulation or out-of-specification environmental parameters are detected. In another embodiment, the tamper-resistant components are configured for "cold zeroisation", which is the ability to zeroise itself even after its power supply has been interrupted. Moreover, the tamper-resistant components may be designed in such a manner that they are internally pre-stressed, so the chip will fracture if interfered with.

The mobile cryptographic device includes a sending element and a receiving element 235 for transferring data signals between itself and the communication device. Transmission of data signals may be facilitated through wireless technologies such as, for example, GSM, CDMA, Bluetooth, or Wi-Fi. In one embodiment, data transmissions may be facilitated through a wireline connection between the mobile cryptographic device 205 and the communication device. However, practitioners will appreciate that the disclosed interactions between the mobile cryptographic device and communication device may be facilitated through any means known now and in the future.

Referring again to FIG. 1, in describing the features of the disclosed mobile cryptographic device, reference may be made to various "elements", "modules", "components", and "applications." For example, those of ordinary skill in the art will appreciate that various functions may be described as being facilitated by a "sending element", "receiving element", "encryption element", "rules element", or "memory element." However, each of these described elements may be combined with or embodied within other elements such as, for example, the processor element.

The mobile cryptographic device is configured to provide cryptographic services to a disparately located communication device over a communications network. To facilitate this, the mobile cryptographic device includes a processor element. The processor element is configured to receive a connection request from a disparately located communication device by way of a wired or wireless communications network. The connection request originates at the communication device in response to, for example, a user 110 wishing to facilitate a secure call, send a secure SMS message, or send a secure email message. The connection request seeks to establish a secure communications channel between the communication device and the mobile cryptographic device. In one embodiment, the connection request may include credentials relating to the user 110, communication device 105, or both. In accordance with this embodiment, rules pertaining to encryption methods and communication device policing may be sent to the communication device following positive verification by the mobile cryptographic device.

In another embodiment, the connection request may not include credentials, but rather information indicative of the type of secure communication requested. The request may further include information relating to the location of the communication device such as, for example, information obtained from the Global Positioning System (GPS) features of the communication device. Moreover, the connection request may include information relating to the type and/or configuration of originating communication device. This information might include whether the communication device is configured with a biometric reader, for example. Based on information contained in the connection request, the mobile cryptographic device may determine the type of credentials required in order to establish a connection. For example, if GPS information indicates that the communication device is located in Iraq, logic in the mobile cryptographic device may indicate that verification of the user 110 based on a biometric is required.

In accordance with the above embodiment, the rules engine determines verification requirements for the user 110 and communication device 105, and sends a connection response to the communication device. The CDI 120 at the communication device receives the connection response and invokes the appropriate prompts and/or applications in order to obtain the credentials (e.g., activating an iris scanner or prompting the user 110 to enter a PIN).

In either of the above embodiments, the CDI 120 obtains the required credentials and sends them to the mobile cryptographic device where they are received by a receiving element. A validation element performs an analysis of the received credentials in order to validate the user 110, communication device 105, and mobile cryptographic device 115. As noted above, credentials may include information identifying the user 110 and information identifying the communication device. Credentials may also be obtained from the mobile cryptographic device 115 itself. Mobile cryptographic device credentials may include information relating to the identity of the mobile cryptographic device and/or any information pertaining to the overall health of the device (e.g., date of the most recent application updates, hardware configurations, tamper indications, etc.).

Those of ordinary skill in the art will appreciate that depending on the type of credentials to be verified, the validation element may use any known method for identifying a credential match. For example, verification processes relating to an iris scan will differ significantly from the verification of a PIN. Moreover, it is contemplated that the verification procedures disclosed herein may be performed by the mobile cryptographic device, however; this is not necessary. For example, the mobile cryptographic device may be tasked with determining a sufficient type of verification based on a number of factors. This information may be sent to the communication device, where the CDI 120 invokes the appropriate prompt and/or interface for collecting the credentials in accordance with the rules set forth by the mobile cryptographic device. Verification of the collected credentials may be performed by the communication device where a confirmation message is sent to the mobile cryptographic device upon successful verification.

On successful verification of the identities as noted above, an encryption element is invoked in order to encrypt data originating at the communication device. Again, depending on the nature of the data and other factors (e.g., location, time, communication device configuration, etc.), the encryption method may vary and include, for example, Type 1 and Non-Type 1 encryption. As such, when a voice call, SMS message, or email message is invoked at the communication device, the voice and/or message data is sent to the mobile cryptographic device in the form of a message signal. The encryption element applies a selected cryptographic function to create an encrypted communication signal. Additionally, a rules element may construct one or more commands based on the type of communication being performed.

Specifically, the rules element is configured to construct a communication device command based on a predefined rule or a type associated with the communication signal. When received at the communication device, the device command invokes a security function at the communication device. As noted above, the security function may include a policing feature that ensures that data relating to the message signal, or the encryption thereof, is not maintained at the communication device when it is no longer needed. A command signal may also invoke an application, which performs a security health check on the communication device to determine, for example, whether the communication device includes requisite antivirus and antispyware detection capabilities. Other security functions, which may be executed at the communication device based on a command from the mobile cryptographic device include monitoring application execution, monitoring user interaction, and erasing stored data.

When the communication signal has been encrypted, a sending element sends the security function and/or the encrypted communication signal to the communication device. When received by the communication device, the CDI 120 executes the security function (if present) and transmits the encrypted communication signal to a gateway by way of a communication device transmitter. Practitioners will appreciate that the communication signal may be transmitted over a cellular network or Internet as is known in the art. The gateway may include a computing system, which is configured to receive the encrypted communication signal, decrypt the communication signal, and send the decrypted communication signal to the intended receiving device.

Cryptographic Functions

Practitioners will appreciate that encryption methodologies and techniques are fluid in nature and continue to evolve over time. As such, the following descriptions of various known encryption methodologies are presented for explanation only and do not limit the scope of the invention. As described in its various embodiments, the mobile cryptographic device 115 may be equipped with various hardware and software components suitable for ensuring that voice and data communications originating at the communication device 105 cannot be decipherable by unauthorized people and that messages cannot be forged (nonrepudiation).

The encryption techniques employed by the mobile cryptographic device 115 may include any known and/or future encryption methodologies. In one embodiment, encryption can be applied to voice as well as data. In general, the mobile cryptographic device 115 is connected to a network (i.e., radio network) by way of the communication device 105 and encrypts data using a cipher or encryption algorithm and an encryption key. Using voice communication as an example, a secret encryption key may be used to encode voice using the encryption algorithm before sending the encrypted voice signal to the communication device 105. The encrypted voice stream can then be transmitted securely over a cellular communication system, for example, to a destination or target device. In order to decode the encrypted voice stream, the destination device must use the same secret encryption key, which was used to encrypt the voice stream and apply a cipher or decryption algorithm.

In a symmetric or "secret-key" embodiment, the mobile cryptographic device 115 employs symmetric key algorithms where identical encryption and decryption keys are used to encrypt and decrypt the data. Therefore, to exchange enciphered data a single key value must be shared between the mobile cryptographic device 115 and the receiving device and protected by both parties.

In an asymmetric or "public-key" embodiment, the mobile cryptographic device 115 employs asymmetric key exchange (AKE) algorithms, which use separate public and private keys. These asymmetric key exchange algorithms include, for example, Diffie-Hellman, Rivest, Shamir, and Adelman (RSA), Digital Signature Algorithm (DSA), ElGamal, and Elliptic Curve Cryptography (ECC). In accordance with this embodiment, a single operation is used to generate the pair of public and private keys. The public key can be made publicly available and can be safely shared with everyone including the other party to a secure communication. The private key is kept secure or secret by the individual who generated the key pair. To exchange encrypted data each party to the exchange makes their public key available, and keeps their private key secret. The keys are typically different from each other, but neither key can be deduced from the other. Because the private key needs to be kept only by one party, it never needs to be transmitted over any potentially compromised networks.

In one embodiment, the mobile cryptographic device 115 receives a data signal from a securely paired communication device 105. A security program executing at the mobile cryptographic device 115 employs a block cipher, which uses a shared secret encryption methodology. One such block cipher is a variant of the Data Encryption Standard (DES). Triple DES has been approved by the United States Government's National Institute of Standards and Technology (NIST) for use through 2030 for sensitive government information. Accordingly, an encryption program executing at the mobile cryptographic device 115 uses a key bundle comprising three 56 bit DES keys to triple encrypt each block, which comprises 64 bits of the data signal. The key bundle may comprise varying configuration of keys (keying options), which may include, for example, each key being unique; two keys being identical with the third being independent; and each of the three keys being identical.

In another embodiment, the Advanced Encryption Standard (AES) is employed by the mobile cryptographic device 115. AES became effective as a Federal government standard on May 26, 2002 after approval by the Secretary of Commerce. It is available in many different encryption packages, AES being the first publicly accessible and open cipher approved by the NSA for top secret information In general, AES comprises three block ciphers, AES-128, AES-192 and AES-256, which have been adopted from a larger published collection of ciphers. Each of the cipher blocks comprises a 128-bit block size, with key sizes of 128, 192 and 256 bits, respectively. Accordingly, the mobile cryptographic device 115 invokes an AES cipher in response to receiving an input from the communication device 105. In one embodiment, the AES cipher is specified as a number of repetitions of transformation rounds, which convert the input into the final ciphered output. Each transformation round consists of several processing steps, including one that depends on the encryption key. When the ciphered signal is received by a receiving device, a set of reverse rounds are applied to transform ciphered signal back into the original input using the same encryption key, which was used by the mobile cryptographic device 115. For a more detailed description of AES, see "The Design of Rijndael: AES—The Advanced Encryption Standard" by Joan Daemen and Vincent Rijmen, published by Springer 2002, which is hereby incorporated by reference.

As noted herein, the mobile cryptographic device 115 may employ any number of cryptographic methodologies to create a ciphered signal for voice and data communications. For example, while AES is generally described above, this is but one embodiment and the invention may implement any block cipher known now or in the future. Further, those of ordinary skill in the art will appreciate that variances in cryptographic algorithms may be implemented based on factors such as, for example, the level of security required, the location of the communication originator, the location of the communication recipient, the date and/or time of the communication, the communication type, and the like. With reference to communication type, methods for encrypting voice communications are subsequently described.

Secure Communications Interoperability Protocol (SCIP) is a multinational standard for secure voice and data communication. SCIP derived from the US Government Future Narrowband Digital Terminal (FNBDT) project and it supports a number of different modes, including national and multinational modes employing different types of cryptography.

The mobile cryptographic device 115 may be configured to operate with a wide variety of communications systems, including commercial land line telephone, military radios, communication satellites, Voice over IP and the several different cellular telephone standards. As such, the mobile cryptographic device 115 may employ SCIP, which is indifferent to the underlying channel other than a minimum bandwidth of 2400 Hz. Using SCIP, the communication device 105 (by way of the mobile cryptographic device 115) and a receiving device first negotiate the required parameters prior to selecting the optimal communication mode.

In accordance with the SCIP standards, the mobile cryptographic device 115 facilitates several functions: key management, voice compression, encryption and a signaling plan. Each will be described in greater detail herein. Those of ordinary skill in the art will appreciate that the various described features may not comprise every function, which may be performed and that the following is presented for explanation only. Moreover, the following description is specific to SCIP, however; it should be noted that other standards and methodologies may be employed by the present invention to facilitate voice encryption.

Key Management

When the mobile cryptographic device 115 has been securely paired with a communication device 105, the mobile cryptographic device 115 receives a signal to set up a secure call. To set up the secure call, a new Traffic Encryption Key (TEK) is negotiated. For Type 1 security (classified calls), the SCIP signaling plan uses an enhanced FIREFLY messaging system for key exchange. FIREFLY is an NSA key management system based on public key cryptography. At least one commercial grade implementation uses Diffie-Hellman key exchange.

Voice Compression Using Voice Coders (Vocoders)

The SCIP based mobile cryptographic device 115 may function with a variety of vocoders, but the standard requires, as a minimum, support for the Mixed Excitation Linear Prediction coder (MELP), an enhanced MELP algorithm known as MELPe, with additional preprocessing, analyzer and synthesizer capabilities for improved intelligibility and noise robustness. The old MELP and the new MELPe are interoperable and both operate at 2400 bit/s, sending a 54 bit data frame every 22.5 milliseconds but the MELPe has optional additional rates of 1200 bit/s and 600 bit/s.

In accordance with SCIP, 2400 bit/s MELPe is the only mandatory voice coder. Other voice coders can be supported in terminals. These can be used if all devices involved in the call support the same coder (agreed during the negotiation stage of call setup) and the network can support the required throughput. G.729D is the most widely supported non-mandatory voice coder in SCIP terminals as it offers a good compromise between higher voice quality without dramatically increasing the required throughput.

The security used by the multinational and national modes of SCIP is defined by the SCIP 23x family of documents. SCIP 231 defines AES based cryptography, which can be used internationally. SCIP 232 defines an alternate multinational cryptographic solution. Several nations have defined, or are defining, their own national security modes for SCIP.

SCIP 230 defines the cryptography of the US national mode of SCIP. For security, SCIP uses a block cipher operating in counter mode. A new Traffic Encryption Key (TEK) is negotiated for each call. The block cipher is fed a 64-bit state vector (SV) as input. If the cipher's block size is longer than 64 bits, a fixed filler is added. The output from the block cipher is xored with the MELP data frames to create the cipher text, which is then transmitted.

The low-order two bits of the state vector are reserved for applications where the data frame is longer than the block cipher output. The next 42 bits are the counter and four bits are used to represent the transmission mode. This allows more than one mode, e.g. voice and data, to operate at the same time with the same TEK. The high-order 16 bits are a sender ID. This allows multiple senders on a single channel to all use the same TEK. Note that since overall SCIP encryption is effectively a stream cipher, it is essential that the same state vector value never be used twice for a given TEK. At MELP data rates, a 42-bit counter allows a call over three thousand years long before the encryption repeats.

For Type 1 security, SCIP uses BATON, a 128-bit block design. With this or other 128-bit ciphers, such as AES, SCIP specifies that two data frames are encrypted with each cipher output bloc, the first beginning at bit 1, the second at bit 57 (i.e. the next byte boundary).

Additional Device Features

The mobile cryptographic device 115 may be used to facilitate additional features where highly secure encryption is required and/or desirable. For example, the disclosed mobile cryptographic device 115 may be used as a trusted endpoint for securely interfacing with other devices or maintaining credentials. As a trusted endpoint, the mobile cryptographic device 115 may implement security standards, which exceed those utilized by smart cards, SIMs, and various hardware encryption keys. As a trusted endpoint, the mobile cryptographic device 115 may maintain, for instance, biometric information, which may be used to ensure a user 110 identity.

The mobile cryptographic device 115 may also be configured to manage data-at-rest encryption at the communication device 105. Businesses, government agencies, and other institutions are concerned about the ever-present threat posed by hackers to data-at-rest. Therefore, security measures such as data encryption and hierarchical password protection may be implemented by the mobile cryptographic device 115 in order to keep data-at-rest from being accessed, stolen, or altered by unauthorized people.

In one embodiment, the operating system implemented by the mobile communication device 105 is very specific with assorted functions being protected with varying levels of restriction. In other words, the operating system may be created to support the disclosed functions through a very specialized operating system, whereby the source code is largely undisclosed and certain features may be made available to third-party applications. In another embodiment, the mobile cryptography device implements a commercially available operating system (e.g., Windows Mobile, Google Android, and Apple iPhone). In yet another embodiment, the mobile cryptographic device 115 implements any combination of specialized, restricted, and unrestricted operating systems.

The mobile cryptographic device 115 implements a software architectural property, which allows it to expand in features to accommodate a broad range of user 110s and conditions. To accommodate variations in user 110s, standards, and technologies, the mobile cryptographic device 115 is scalable in that third-parties may develop applications, which are operational at the communication device 105 and utilize the security features of the mobile cryptographic device 115. Allowing software developers and/or hardware engineers to access certain features through an Application Programming Interface (API), while protecting other features is desirable. As such, a Software Development Kit (SDK) is contemplated, through, which selected functions are exposed while ensuring that the highly secure encryption algorithms are not compromised. The SDK may include a compiler, linker, and debugger. The mobile cryptographic device 115 SDK may also include libraries and documentation for the APIs.

Figure 3:
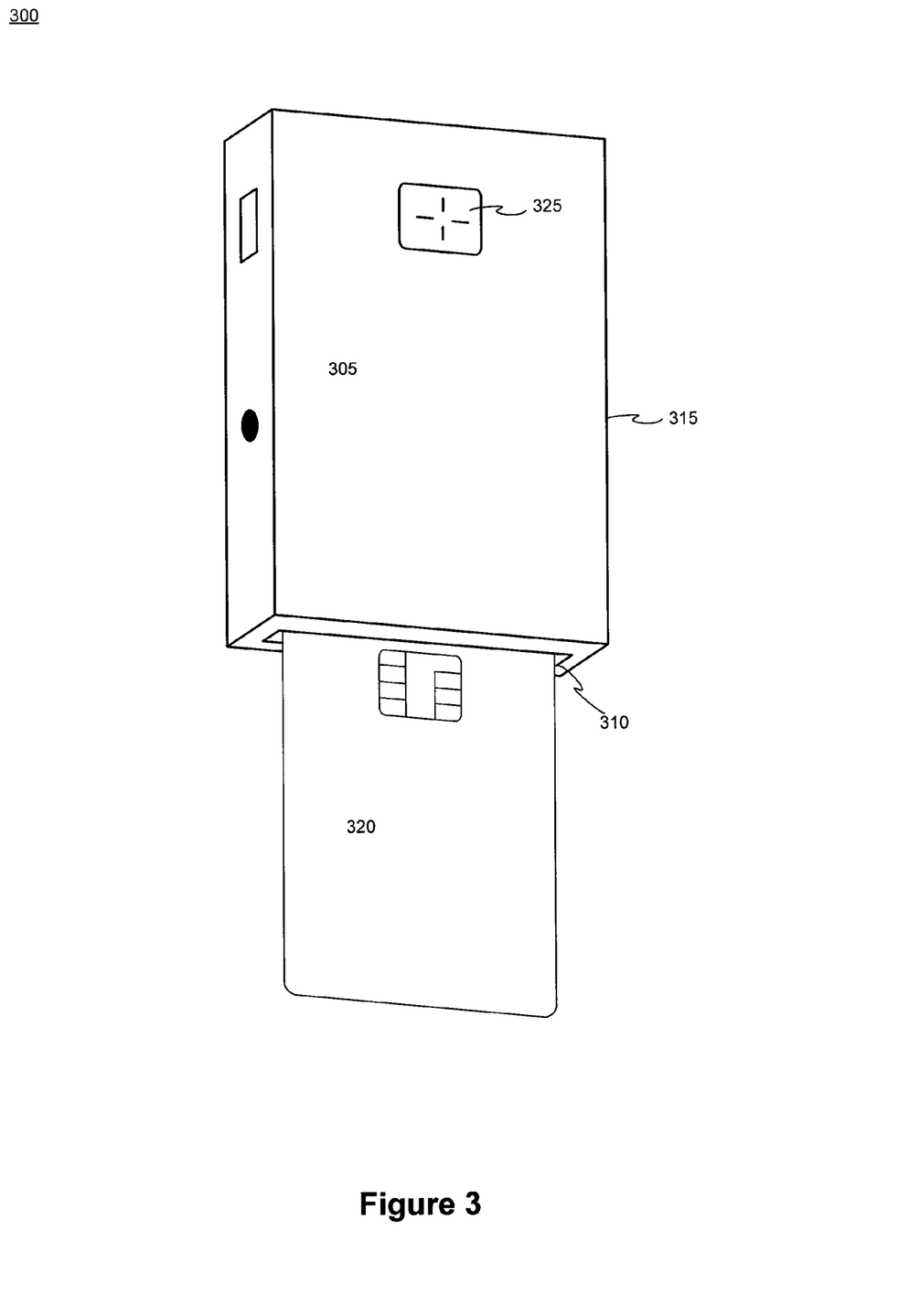
FIG. 3 is a system diagram illustrating a mobile cryptographic device equipped with physical identity verification components in accordance with an exemplary embodiment of the present invention.

In one embodiment and in reference to FIG. 3, the mobile cryptographic device 305 is equipped with a smartcard reader 310, which enables the mobile cryptographic device 305 to work with certificates on smartcards 320 to, for example, leverage an organizations S/MIME infrastructure and enable users to digitally sign and encrypt messages originating at their communication device 305 to provide sender-to-recipient security. Some of these smartcards are also made to support the NIST standard for Personal Identity Verification (PIV).

Cryptographic smart cards are often used for single sign-on. Most advanced smart cards include specialized cryptographic hardware, which uses algorithms such as RSA and DSA. Today's cryptographic smart cards generate key pairs on board, to avoid the risk of having more than one copy of the key. Such smart cards are mainly used for digital signature and secure identification. The most widely used cryptographic algorithms in smart cards (excluding the GSM so-called "crypto algorithm") are Triple DES and RSA. The key set is usually loaded (DES) or generated (RSA) on the card at the personalization stage.

A biometric reader equipped device is configured to receive a biometric sample (e.g., a fingerprint, iris scan, retina scan, voiceprint, and etc.). As such, the mobile cryptographic device 305 may be configured with one or more onboard biometric readers 325. In another embodiment, the mobile cryptographic device 305 is configured to receive and process biometric data by way of the communication device. Biometric data may be used for user identity validation, creating digital signatures, or may be used within an equation used to construct a cipher signal.

Any databases discussed herein may be any type of database, such as relational, hierarchical, graphical, object-oriented, and/or other database configurations. Common database products, which may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected, which exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques, which may include fractal compression methods, image compression methods, etc.

In one exemplary embodiment, the ability to store a wide variety of information in different formats is facilitated by storing the information as a Binary Large Object (BLOB). Thus, any binary information may be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using fixed storage allocation, circular queue techniques, or best practices with respect to memory management (e.g., paged memory, least recently used, etc.). By using BLOB methods, the ability to store various data sets, which have different formats facilitates the storage of data associated with the financial transaction instrument by multiple and unrelated owners of the data sets. For example, a first data set, which may be stored may be provided by a first issuer, a second data set, which may be stored may be provided by an unrelated second issuer, and yet a third data set, which may be stored, may be provided by an third issuer unrelated to the first and second issuer. Each of these three exemplary data sets may contain different information, which is stored using different data storage formats and/or techniques. Further, each data set may contain subsets of data, which also may be distinct from other subsets.

The data set annotation may be used for various types of status information as well as other purposes. For example, the data set annotation may include security information establishing access levels. The access levels may, for example, be suitably configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified merchants are permitted to access the data set for reading, and others are altogether excluded from accessing the data set. However, other access restriction parameters may also be used allowing various entities to access a data set with various permission levels as appropriate.

One skilled in the art will also appreciate that, for security reasons, any databases, systems, devices, servers or other components of the present invention may consist of any combination thereof at a single location or at multiple locations, wherein each database or system includes any of various suitable security features, such as firewalls, access codes, encryption, decryption, compression, decompression, and/or the like.

The present invention may be described herein in terms of functional block components, optional selections and/or various processing steps. It should be appreciated that such functional blocks may be realized by any number of hardware and/or software components suitably configured to perform the specified functions. For example, the present invention may employ various integrated circuit components, e.g., memory elements, processing elements, logic elements, look-up tables, and/or the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), Microsoft.Net with the various algorithms being implemented with any combination of data structures, objects, processes, routines or other programming elements. Further, it should be noted that the present invention may employ any number of conventional techniques for data transmission, messaging, data processing, network control, and/or the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by Mayiam Stalling, published by Prentice Hall; all of, which are hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. It should be noted that many alternative or additional functional relationships or physical connections might be present in a practical transaction instrument distribution system.

As may be appreciated by one of ordinary skill in the art, the present invention may be embodied as a method, a data processing system, a device for data processing, a transaction instrument, and/or a computer program product. Accordingly, the present invention may take the form of an entirely software embodiment, an entirely hardware embodiment, or an embodiment combining aspects of both software and hardware or other physical devices. Furthermore, the present invention may take the form of a computer program product on a tangible computer-readable storage medium having computer-readable program code means embodied in the storage medium. Any suitable tangible computer-readable storage medium may be utilized, including hard disks, CD-ROM, optical storage devices, magnetic storage devices, and/or the like.

These computer program instructions may also be stored in a computer-readable memory, which may direct a computer or other programmable data processing apparatus to function in a particular manner, such that the instructions stored in the computer-readable memory produce an article of manufacture including instruction means, which implement functions of flowchart block or blocks. The computer program instructions may also be loaded onto a computer or other programmable data processing apparatus to cause a series of operational steps to be performed on the computer or other programmable apparatus to produce a computer-implemented process such that the instructions, which execute on the computer or other programmable apparatus include steps for implementing the functions specified in the flowchart block or blocks.

In the foregoing specification, the invention has been described with reference to specific embodiments. However, it may be appreciated that various modifications and changes may be made without departing from the scope of the present invention. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented.

Benefits, other advantages, and solutions to problems have been described above with regard to specific embodiments. However, the benefits, advantages, solutions to problems, and any element(s), which may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus, which comprises a list of elements does not include only those elements but may include other elements not expressly listed or inherent to such process, method, article, or apparatus. Further, no element described herein is required for the practice of the invention unless expressly described as "essential" or "critical".

We claim:

1. A data security system for providing cryptographic services to a disparately located communication device over a communications network, said data security system comprising:

a processor for receiving a connection request from said disparately located communication device, wherein said connection request is by way of at least one of: a wired or wireless communications network;

a validation element, in communication with said processor and positioned proximate with said processor, for performing an analysis of said connection request, wherein said analysis comprises a validation of at least one of: said data security system, an identity of said communication device, or a user identity;

said processor for receiving a communication signal from said disparately located communication device based on said analysis by said validation element;

an encryption element, in communication with said processor, for executing a cryptographic function for manipulating said communication signal to form an encrypted communication signal;

a rules element, in communication with said processor, for compiling a communication device command based on at least one of: a predefined rule or a type associated with said communication signal, wherein said communication device command invokes a security function at said disparately located communication device;

a sending element, in communication with said processor, for sending at least one of: said security function or said encrypted communication signal to said disparately located communication device, wherein said disparately located communication device at least of one: executes said device command or transmits said encrypted communication signal to a destination server; and wherein said data security system facilitates secure commercial features in accordance with government entity certification protocols.

2. The system of claim 1, further comprising a credential, wherein said credential is at least one of: a biometric sample, an alphanumeric code, a password, or a digital certificate.

3. The system of claim 1, wherein said request signal is invoked by at least one of: a smartphone, smartdevice, cellular telephone, a personal digital assistant, a personal computer, an electronic fob, a computer server, an entertainment device, or an appliance.

4. The system of claim 1, wherein said data security system and said disparately located communication device are not physically coupled.

5. The system of claim 1, wherein said communication signal is at least one of: voice communication, Short Message Service (SMS), Electronic Mail (e-mail), data communication, or data transfer.

6. The system of claim 1, wherein said disparately located communication device is at least one of: a non-specialized or a commercial wireless mobile device configured to facilitate at least one of: commercial or high assurance transmissions.

7. The system of claim 1, wherein said data security system further comprises an interface for facilitating secure application execution.

8. The system of claim 1, wherein said data security system further comprises a Controlled Cryptographic Item (CCI) validated by a governing entity.

9. The system of claim 1, wherein said data security system is configured to be suitably concealed in a location, which is geographically distinct from a geographic location of said disparately located communication device.

10. The system of claim 1, wherein said request signal and said communication signal are facilitated by way of at least one of: GSM, CDMA, Bluetooth, or Wi-Fi.

11. The system of claim 1, wherein said disparately located communication device is a commercially available device configured to execute commercially available application.

12. The system of claim 1, wherein cryptography element interfaces with a security program of said disparately located communication device.

13. The system of claim 1, wherein said device command is configured to cause a security element of said disparately located communication device to at least one of: monitor application execution, monitor user interaction, or erase stored data based on a command invoked by said cryptography module.

14. The system of claim 1, wherein said encryption comprises data-at-rest-encryption.

15. The system of claim 1, further comprising invoking, by said processor, protected execution cells in support of a plurality of application operating systems.

16. The system of claim 1, further comprising randomly validating, by said processor, a customer controlled server.

17. The system of claim 1, wherein said disparately located communication device includes an application developed by way of a Software Development Kit (SDK) for secure application development.

18. The system of claim 1, wherein said processor comprises a distributed control system to manage at least one of: signals, transmission of signals, encryption of signals, development of encryption keys, providing current encryption keys to said receiver element, determination of schedules of times and frequencies of transmitted signals, or providing schedules of encryption keys and frequencies to said receiver element.

19. The system of claim 1, wherein said data communications system is suitably configured to be discretely positioned out of view of a person.

* * * * *